Patented Sept. 13, 1949

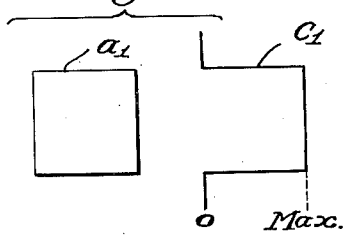
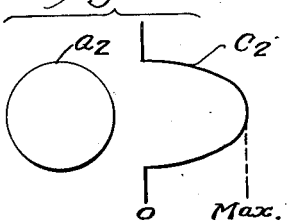
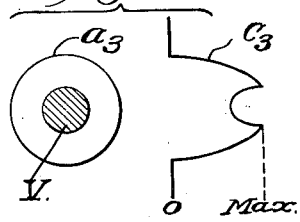
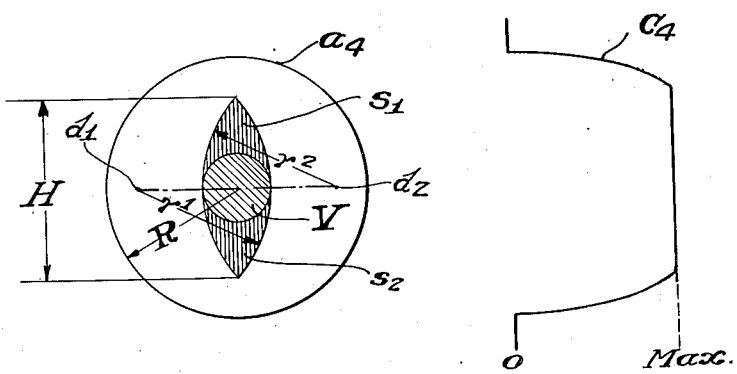
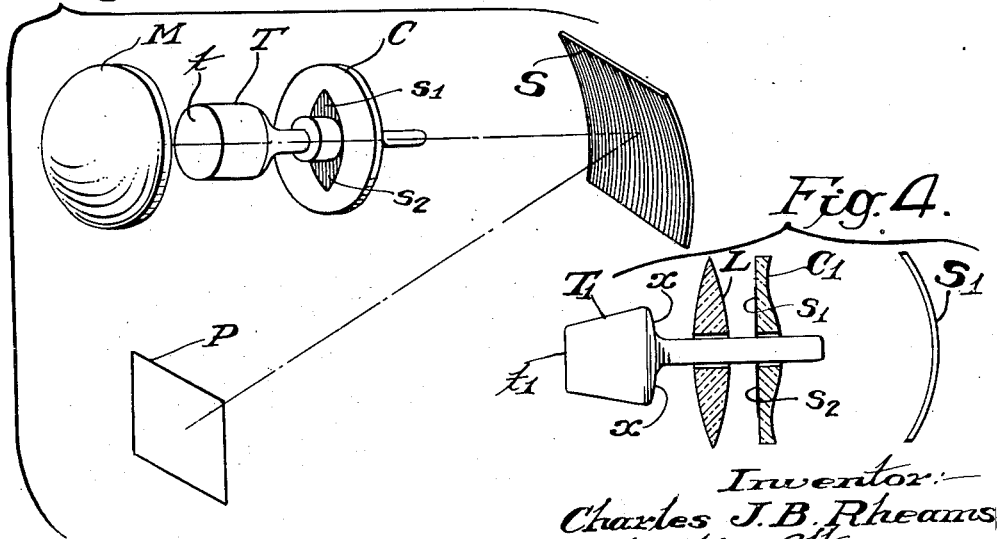

2,481,615

UNITED STATES PATENT OFFICE 2,481,615

IMAGE PROJECTION OPTICAL SYSTEM WITH CYLINDRICAL SCREEN MEANS

Charles J. B. Rheams, Philadelphia, Pa., assignor, by mesne assignments, to Philco Corporation, Philadelphia, Pa., a corporation of Pennsylvania Application June 23, 1945, Serial No. 601,111

5 Claims. (Cl. 178—7.5)

1

This invention relates to image-projection optical systems employing a cylindrical optical element, and more particularly to systems of the type in which an image-producing device is disposed in the path of projection or light transmission. The term "cylindrical" is here used in the optical sense, to mean that the said element is curved in some fashion about a single axis, i. e. it is curved only in one direction, as distinguished, for example, from a spherical element.

In its broad aspect, the invention is generally applicable to image-projection systems employing a cylindrical optical element. In its more limited aspect, the invention is primarily intended for use in such an image-projection system adapted to be employed in television receiving apparatus. One example of such a system is a reflective system employing a Schmidt correcting plate, in which system the image-producing picture tube is disposed along the optical axis of the system and the correcting plate surrounds the neck of the tube. However, the invention is not limited to a reflective system, but is applicable as well to systems involving refraction only, as will be shown later.

The use of a cylindrical optical element in an image-projection system is highly desirable in some instances. For example, such an element may be employed to advantage as an image-viewing screen, as described more fully hereinafter. When such an element is employed, however, it accentuates variations in overall brightness of the reproduced image as viewed from different positions in the viewing plane. The reason for this will be shown later.

The principal object of the present invention is to reduce, or substantially eliminate, such variations in the overall brightness of the reproduced image.

Another and more specific object of the invention is to provide novel means for overcoming such variations by centrally masking the aperture of an image-projection system, as described hereinafter.

Still another object of the invention is to provide a novel image-projection system for use in television receiving apparatus, in which system the overall brightness of the reproduced image is substantially uniform throughout the viewing plane, with the result that an observer may view the reproduced image from any point in the viewing plane without noticeable variation in overall brightness of the reproduced image.

Other objects and features of the invention

2 will become apparent as the description proceeds.

In the accompanying drawing:

Figs. 1a, 1b and 1c illustrate schematically the brightness distribution curves obtained with different types of aperture stops in a system employing a cylindrical optical element;

Fig. 2 is a similar illustration, on a larger scale, illustrating one form of the novel aperture stop means employed according to the present invention, and also illustrating the brightness distribution curve obtained;

Fig. 3 illustrates an image-projection system of the reflective type, embodying the present invention; and Fig. 4 illustrates an image-projection system of the refractive type, embodying the invention.

The present invention is in the nature of an improvement of the invention disclosed and broadly claimed in a copending application of Ernest Traub, Serial No. 599,927, filed June 16, 1945.

In the said Traub application, there is disclosed a system which employs an optical stop means for reducing, or substantially eliminating, the above-mentioned undesirable effect produced by a cylindrical optical element. The specific stop means provided in the Traub application masks off outer portions of the aperture to accomplish the desired object. The present invention provides improved stop means for masking off the central area of the aperture.

The invention may best be described by first referring to Fig. 3 which may be taken as typical of a system employing a cylindrical optical element as above mentioned. In this instance, the cylindrical element serves as the image-viewing screen. While the present invention is primarily concerned with a system in which such an element is thus employed, it is not limited thereto but is applicable in any instance in which a cylindrical element forms part of the image-reproducing means generally. The system illustrated in Fig. 3 is adapted for use in a television receiving apparatus, and it comprises a picture tube T, a spherical reflector or mirror M, a Schmidt correcting plate C, and a cylindrical image-viewing screen S. The image formed on the screen $t$ of tube T is reflected by the reflector M onto the cylindrical screen S. The cylindrical screen S is adapted to be viewed from a position in the viewing plane represented at P. The optical axis of the system is indicated by the dot and dash lines. The correcting plate C serves to correct for spherical aberration of the reflector M, as well understood by those skilled in the art. For the present, the elements $s_1$ and $s_2$ may be disregarded.

The cylindrical screen S, which is illustrated with its axis disposed horizontally, is preferably of the type disclosed and claimed in copending application Serial No. 651,064, filed March 1, 1946, now abandoned. It may consist of a sheet of stainless steel having fine scratches or marks running vertically. As previously mentioned, the use of a cylindrical screen is very desirable. Such a screen is highly efficient in the reproduction of projected enlarged images because it offsets, or compensates for, in major part the loss in brightness normally encountered in the projection and resolution of the image. A screen of this type defines a viewing area within which the apparent brightness of the image reproduced on the screen is greatly increased to such an extent that the viewing of the image becomes independent of extraneous illumination.

Such a screen is also distinctive as respects the apparent brightness of the reproduced image in relation to the aperture of the optical system, as may be seen from the following comparison with an ordinary screen. For ordinary screens, the apparent brightness is expressed by the equation:

$$(1) \quad B_s = B_t \cdot \frac{1}{F^2} \cdot \frac{1}{(M+1)^2}$$

where $B_s$ is apparent brightness of the image, $B_t$ is the primary image brightness, F is the numerical aperture of the system, and M is the magnification power of the system. It will be seen that the apparent brightness is dependent upon both horizontal and vertical aperture, since the numerical aperture F is determined by the entire aperture area.

For a cylindrical screen, however, arranged so that its axis is horizontal, the apparent brightness of the image is expressed by the following equation:

$$(2) \quad B_s = B_t \cdot \frac{1}{F_h} \cdot \frac{1}{M+1}$$

where $F_h$ is the horizontal aperture of the system, and the other quantities are as previously mentioned. It will be seen that in this case, the apparent brightness of the image is independent of vertical aperture and is dependent only upon horizontal aperture.

Notwithstanding its desirability, the cylindrical image-reproducing element or screen causes undesired variation in overall brightness of the image as viewed from vertically different positions in the viewing plane, especially when the screen is employed in a system of the type in which an image-producing device is disposed in the path of projection, as in the system of Fig. 3. This is due to the fact that, with such a screen, the apparent brightness of the image is very substantially affected by variation of the horizontal aperture, as is evident from Equation 2 above.

The undesirable variation in overall brightness produced by such a screen may be envisioned with the aid of Figs. 1a to 1c. Fig. 1a depicts the ideal condition which would obtain if the aperture $a_1$ were square or rectangular, i. e. of uniform horizontal dimension. As shown by the brightness distribution curve $c_1$, the overall brightness of the image would be constant throughout the vertical height of the viewing plane. It is customary, however, to employ circular or round optical elements, and therefore the condition of Fig. 1a does not obtain in practice.

Fig. 1b shows the variation in overall image brightness due to variation of the horizontal dimension of a circular or round aperture $a_2$. The brightness distribution curve $c_2$ shows that the image is brightest centrally of the vertical height of the viewing plane and decreases for other positions in said plane. This is due to the fact that the horizontal dimension of the aperture is greatest centrally of its height and decreases above and below the center. This effect is accentuated by the cylindrical screen for the reason previously stated.

While the condition of Fig. 1b may be tolerable, the undesired effect becomes intolerable when the horizontal dimension of the aperture is further varied by central masking due to the presence of the image-producing device in the path of projection, as in Fig. 3. The condition which then obtains is depicted in Fig. 1c, wherein the shaded area V represents central masking of the aperture $a_3$. Due to accentuation of the above-mentioned effect by the cylindrical screen, the overall brightness of the image is caused to vary sharply and substantially at different positions along the vertical height of the viewing plane. As shown by curve $c_3$, the image appears brightest when viewed from either of two vertically spaced positions in the viewing plane, and its brightness is greatly diminished when viewed from an intermediate position. This is evidenced by the two distinct humps in curve $c_3$.

In accordance with the present invention, this objection is overcome by employing a novel stop means of the character illustrated in Fig. 2. In the illustration, it is assumed that the central masked area V is circular in shape, and the stop means is designed accordingly; but it is to be understood that the stop means should be designed in any instance according to the shape of the masked area. The novel stop means is characterized in that it provides a horizontal aperture of substantially constant width, thereby eliminating the objectionable brightness variation above mentioned.

Referring to Fig. 2, the stop means illustrated comprises non-transmissive areas $s_1$ and $s_2$ above and below the masked area V, said areas being bounded by two intersecting arcs, tangent to the masked area V, struck from centers $d_1$ and $d_2$ on a horizontal line through the center of area V, with radii $r_1$ and $r_2$ approximately equal to the radius R of the aperture $a_4$. With the stop means of the present invention, the horizontal width of the unmasked area is substantially constant over the height H of the entire masked area. Consequently, there is obtained a brightness curve as shown at $c_4$ in Fig. 2, which is a close approximation of the ideal brightness curve shown at $c_1$ in Fig. 1a.

As illustrated in Fig. 2, the invention contemplates the formation of a total masked area which is centrally located and extends vertically of the circular aperture.

Referring again to Fig. 3, the novel stop means of the present invention may be conveniently formed as a part of the correcting plate C by painting or otherwise forming the stop elements $s_1$ and $s_2$ directly on the correcting plate as illustrated. However, the stop means may take the form of a separate element, and it may be disposed either in front of or behind the correcting plate, so long as it is interposed in the projection path between elements M and S in a position to provide the aperture of the system.

As previously noted, the cylindrical image-reproducing element S is so disposed that its axis is horizontal, and while such disposition of element S is preferable and the foregoing description is with reference thereto, no limitation is intended in this respect. In any event, however, the stop means provided by the present invention is so positioned in relation to the cylindrical element that the central masked area extends normal to the axis of said element, and the light-transmission area formed by the stop means is of substantially constant width in the direction of the axis of said element.

In Fig. 4, there is shown a refractive system in which the picture tube T₁ is disposed in the path of projection, and the image produced on the face or screen t₁ of the tube is projected through optically finished portions x of the tube and is focused onto the cylindrical element or screen S₁ by means of a lens L surrounding the neck of the tube. The stop means, provided by the present invention, may comprise opaque and transparent areas formed on the correcting plate C₁, as previously described. Thus, it will be seen that the invention is applicable to refractive systems as well as to reflective systems.

There are several advantages to be obtained by masking off the central area of the aperture of the system, by the light stop means of the present invention, in contrast to masking off the outer margin of the aperture by the light stop means of the above mentioned copending Traub application Serial No. 599,927, of which the present invention is an improvement. For example, in the stop means of the present invention, framework mounting elements and lead wires, normally associated with television tube T and which are usually mounted vertically above and below the tube T, may be disposed almost entirely behind the stop means of the present invention. The portions of said elements and lead wires that extend above and below the stop means reduce the brightness of the image only in the uppermost or lowermost part of the viewing space, and then only to a minor extent. The mechanical simplicity thus afforded will permit economies in the design of the complete projection system in television receiver devices.

While the invention has been described with reference to the illustrated embodiments, it is not limited thereto but is susceptible to further embodiments and modifications within the scope of the appended claims.

I claim:

1. In a picture projection system for a television receiver, a picture tube for producing the picture image to be projected, a spherically surfaced converging means arranged to project the image, said tube being disposed along the optical axis of the system and causing central masking of the system's aperture, a correcting plate disposed in the path of projection, means including a cylindrical element for reproducing the image, said element tending to accentuate variations in overall brightness of the image, as viewed from different positions in a viewing plane, caused by diminution of aperture area in the direction of the axis of said element, and stop means on said correcting plate adapted to effect additional central masking of the aperture such that the effective aperture area is of substantially constant width in the direction of the axis of said element, whereby substantially to eliminate said variations.

2. In a picture projection system for a television receiver, a picture tube for producing the picture image to be projected, a spherical mirror arranged to project the image, said tube being disposed along the optical axis of the system and causing central masking of the system's aperture, a correcting plate surrounding the neck portion of said tube and adapted to correct for spherical aberration of said mirror, means including a cylindrical element for reproducing the image, said element tending to accentuate variations in overall brightness of the image, as viewed from different positions in a viewing plane, caused by diminution of aperture area in the direction of the axis of said element, and stop means on said correcting plate adapted to effect additional central masking of the aperture such that the effective aperture area is of substantially constant width in the direction of the axis of said element, whereby substantially to eliminate said variations.

3. In an image-projection system, an image-producing device disposed in the path of projection and causing masking of the system's aperture, a spherically surfaced converging means arranged to project the image, means including a cylindrical element for reproducing the image, said element tending to accentuate variations in overall brightness of the image, as viewed from different positions in a viewing plane, caused by diminution of aperture area in the direction of the axis of said element, and stop means disposed in the path of projection and comprising non-transmissive elements shaped and dimensioned, according to the aforesaid masking, to effect central masking of the aperture and thus render the width of the aperture area substantially constant in the direction of the axis of said cylindrical element, whereby substantially to eliminate said variations.

4. In an image-projection system, an image-producing device disposed in the path of projection and causing masking of the system's aperture, a spherically surfaced converging means arranged to project the image, means including a cylindrical element for reproducing the image, said element tending to accentuate variations in overall brightness of the image, as viewed from different positions in a viewing plane, caused by diminution of aperture area in the direction of the axis of said element, a light-transmissive member disposed in the path of projection, said member being so positioned and so shaped as to provide the aperture for said system, and non-transmissive elements on said member shaped and dimensioned, according to the aforesaid masking, to effect central masking of the aperture and thus render the width of the aperture area substantially constant in the direction of the axis of said cylindrical element, whereby substantially to eliminate said variations.

5. In a picture-projection system for a television receiver, a picture tube for producing the picture image to be projected, a spherically surfaced converging means arranged to project the image, said tube being disposed in the path of projection and causing masking of the system's aperture, means including a cylindrical element for reproducing the image, said element tending to accentuate variations in overall brightness of the image, as viewed from different positions in a viewing plane, caused by diminution of aperture area in the direction of the axis of said element, a light-transmissive member disposed in the path of projection, said member being so positioned and so shaped as to provide the aperture for said system, and non-transmissive elements on said member shaped and dimensioned, according to the aforesaid masking, to effect central masking of the aperture and thus render the width of the aperture area substantially constant in the direction of the axis of said cylindrical element, whereby substantially to eliminate said variations.

CHARLES J. B. RHEAMS.

REFERENCES CITED

The following references are of record in the file of this patent:

UNITED STATES PATENTS

| Number | Name | Date |
|---|---|---|
| 1,127,763 | Howland | Feb. 9, 1915 |
| 1,212,424 | Tillotson | Jan. 16, 1917 |
| 1,460,744 | Boysen | July 3, 1923 |
| 1,732,051 | Johnson | Oct. 15, 1929 |
| 1,907,558 | Newman | May 9, 1933 |
| 1,935,220 | Wildhaber | Nov. 14, 1933 |
| 2,273,801 | Landis | Feb. 17, 1942 |
| 2,295,779 | Epstein | Sept. 15, 1942 |
| 2,296,943 | Okolicsanyi | Sept. 29, 1942 |
| 2,305,855 | Epstein et al. | Dec. 22, 1942 |
| 2,307,210 | Goldsmith | Jan. 5, 1943 |
| 2,309,788 | Ramsberg | Feb. 2, 1943 |
| 2,342,874 | Links et al. | Feb. 29, 1944 |